United States Patent [19]

Cross et al.

[11] 4,026,217

[45] May 31, 1977

[54] SELF STEERING RAILWAY AXLES AND WHEELS ON TRACK CURVATURES

[75] Inventors: Homer C. Cross, Wantach, N.Y.; Daniel L. Jerman, Ramsey, N.J.

[73] Assignee: Parsons, Brinckerhoff, Quade & Douglas, Inc., New York, N.Y.

[22] Filed: Aug. 7, 1975

[21] Appl. No.: 602,751

[52] U.S. Cl. .............................. 105/224.1; 295/34; 308/180

[51] Int. Cl.² ...................... B61F 15/00; B61F 5/30

[58] Field of Search .......... 105/218 R, 218 A, 219, 105/220, 223, 224 R, 224 A, 224.1, 225; 295/34; 308/180

[56] References Cited

UNITED STATES PATENTS

| | | | |
|---|---|---|---|
| 2,207,848 | 7/1940 | Barrows | 105/224.1 |
| 2,668,505 | 2/1954 | Janeway | 105/223 X |
| 2,802,662 | 8/1957 | Hirst | 105/224.1 X |
| 3,276,395 | 10/1966 | Heintzel | 105/225 X |
| 3,952,669 | 4/1976 | Mauzin et al. | 105/224.1 X |

*Primary Examiner*—Drayton E. Hoffman
*Assistant Examiner*—Fred A. Silverberg
*Attorney, Agent, or Firm*—W. Lee Helms

[57] ABSTRACT

The under surface of an adapter journal box rests upon an assembly composed of semi-annular semi-spherical members consisting of a lower one resting on the outer race of the axle bearing complex, an upper one meeting the top inner face of the adapter journal box, and an intermediate one which is resilient and which may be of thick elastomer. The said assembly lies above and is endwise centered on two opposed and relatively strong resilient abutments, each between one side wall of the adapter journal box and the outer race of the axle bearing complex and which may be of the chevron type in which V-formed elastomer elements are spaced by coacting elements of metal.

6 Claims, 9 Drawing Figures

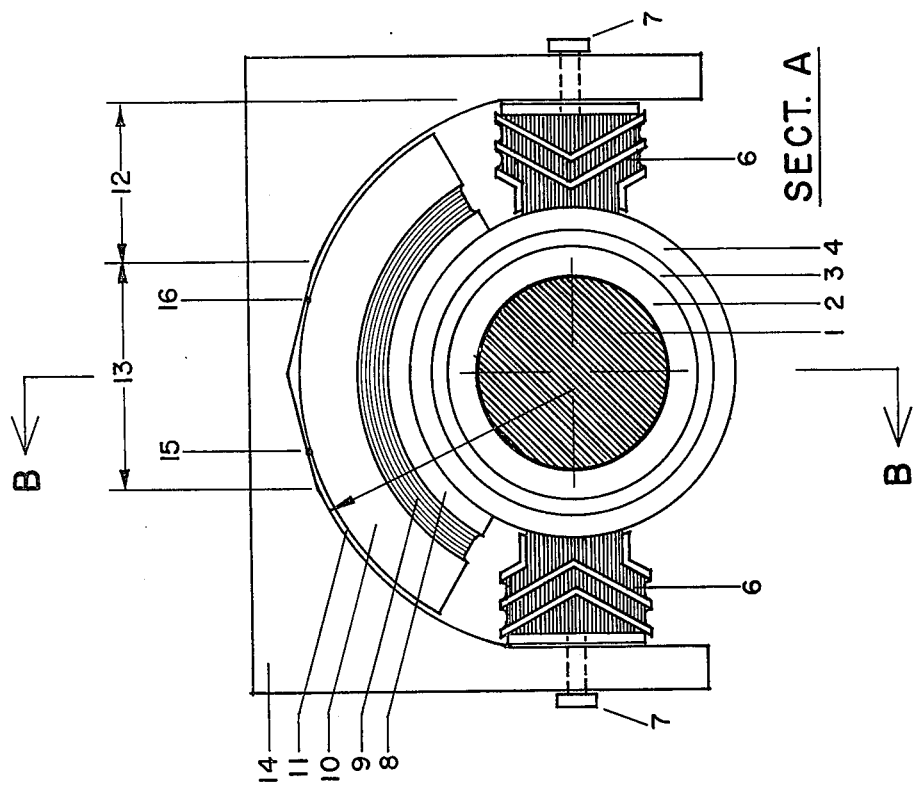
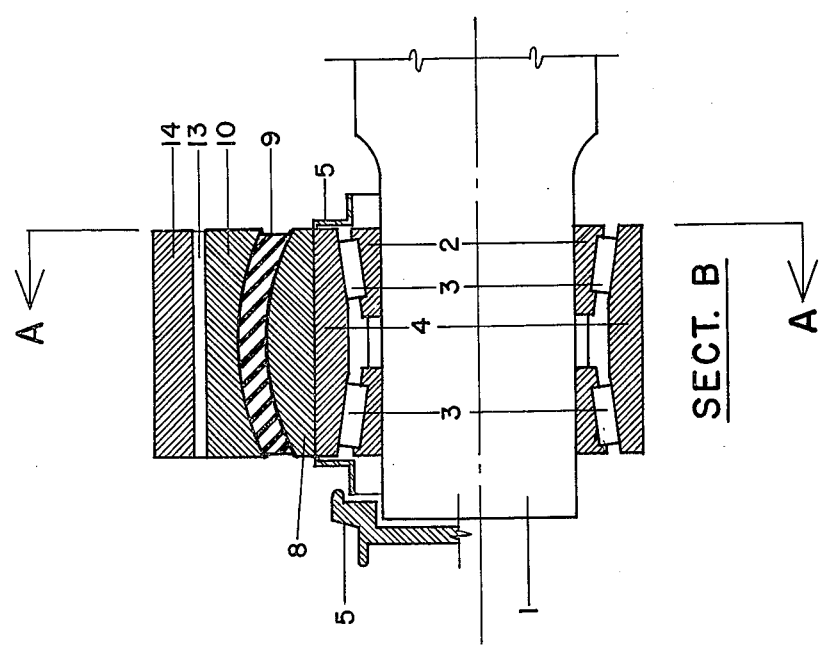

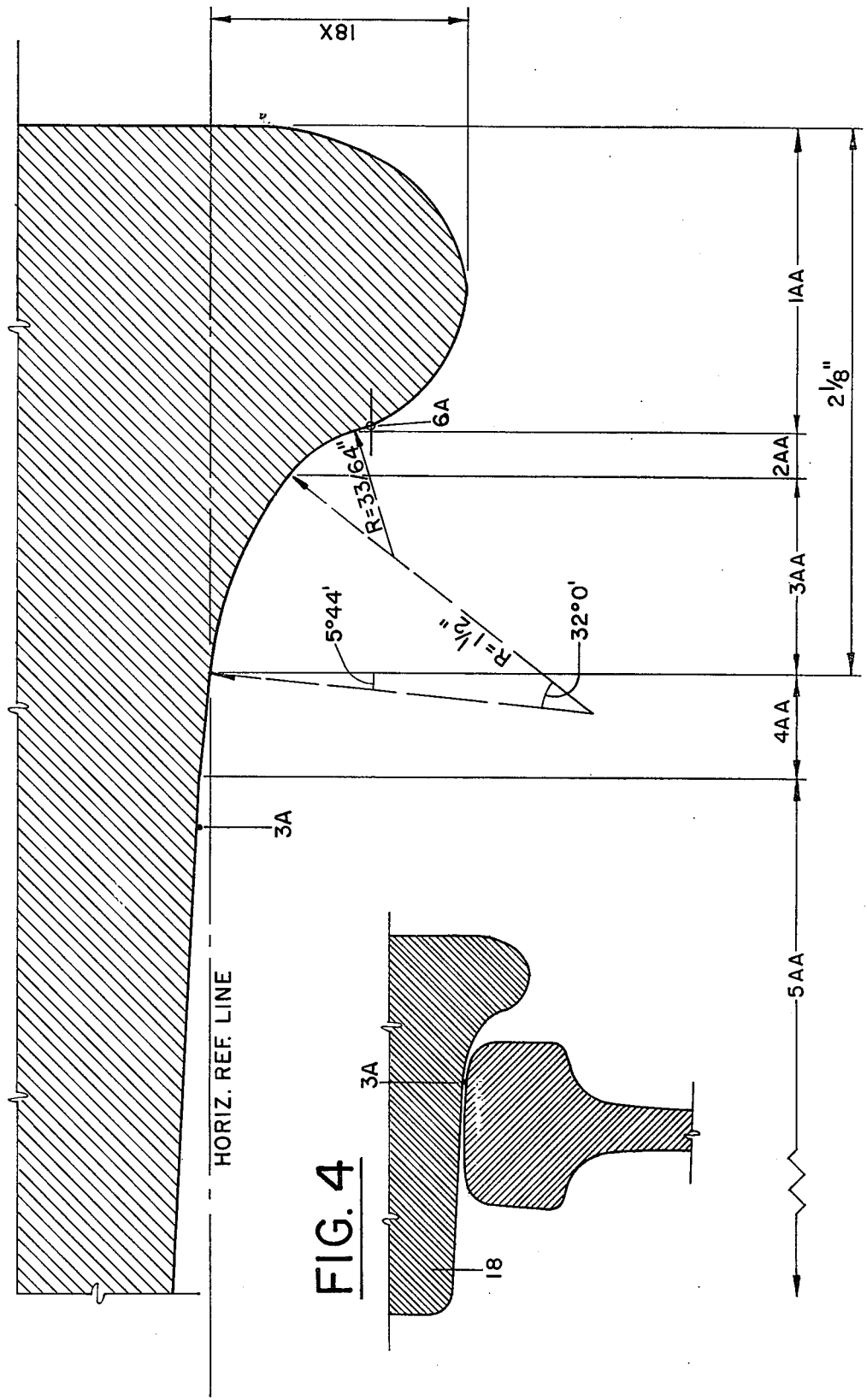

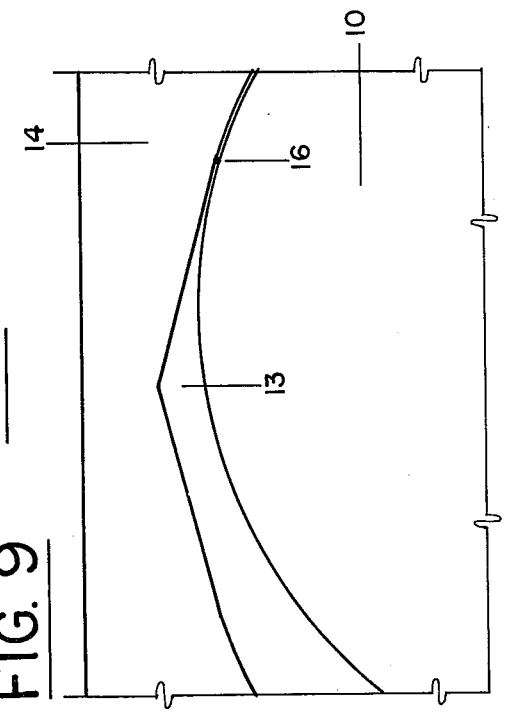
FIG. 9 PLAN
FIG. 8 SECT. B
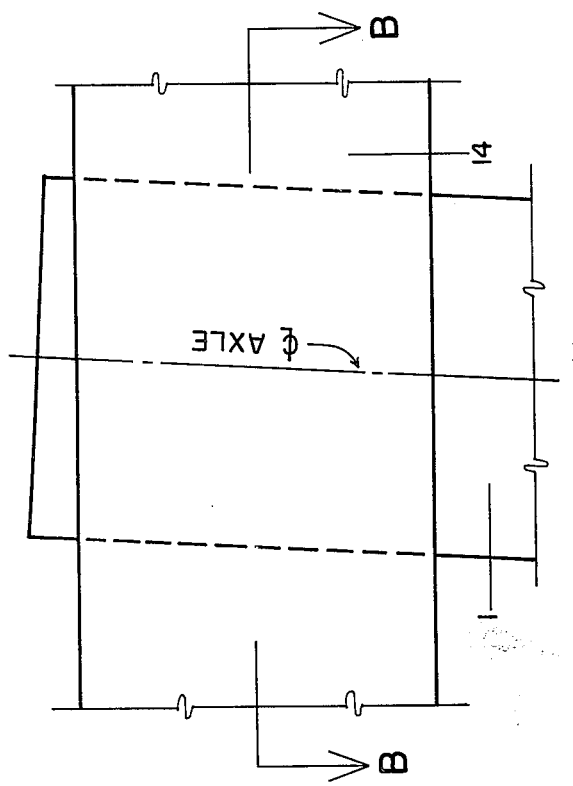
FIG. 7 PLAN
FIG. 6 SECT. A

SELF STEERING RAILWAY AXLES AND WHEELS ON TRACK CURVATURES

The meeting faces of the adapter journal box and the combined semi-spherical members upon which it rests are so formed that eccentric action is imposed on the adapter journal box when said members as a group move angular with the outer race of the axle bearing complex, so that the adapter journal box is raised along with the truck frame resting on it, thus permitting angular movement of the axle and to a degree stabilizing the movement. In the disclosure the semi-spherical members form a section of a cylinder, the upper and lower members being bonded together by an intermediate member of deformable elastomer, the upper and lower members having inner surfaces which are spherical, one concave and the other convex, the faces of the elastomer member being formed accordingly. When the forward outside truck wheel enters a track curvature the resulting pressure upon the wheel imposes such degree of pressure upon the axle as to force it to move to angular position relative to the truck frame, and by virtue of the deformable rubber center of the said semi-spherical cylinder section, the said members of the semi-cylinder are moved along with the axle and its roller bearing complex. The chevron spring lateral abutments for the axle mounted roller bearing complex to a degree stabilize the angular movement and also aid restoration of the axle and bearing complex, together with the overhead composite cylinder section, when the truck forward wheels meet a straight track.

The invention will be described with reference to the accompanying drawings, and with disclosure of an improved truck wheel form. In the drawings:

FIG. 2 is a transverse vertical section through the axle bearing complex and the overhead three-layer cylinder section member, mounted on the journal end of an axle, the view being taken on the line B—B, of FIG. 3.

FIG. 3 is a vertical face view of the assembly showing the journal box, the axle in cross section, and the bearing complex with the overhead three layer cylinder section member and the two lateral chevron type spring members at the sides of the bearing complex, the view being taken on the line A—A of FIG. 2.

FIG. 4 is a cross section through a rail and a partial section through an improved form of wheel.

FIG. 5 is an enlarged view of the wheel lower area section of FIG. 4 with indicia directed to the degrees of inner curvature of the track-engaging end of the wheel.

Figure 1:
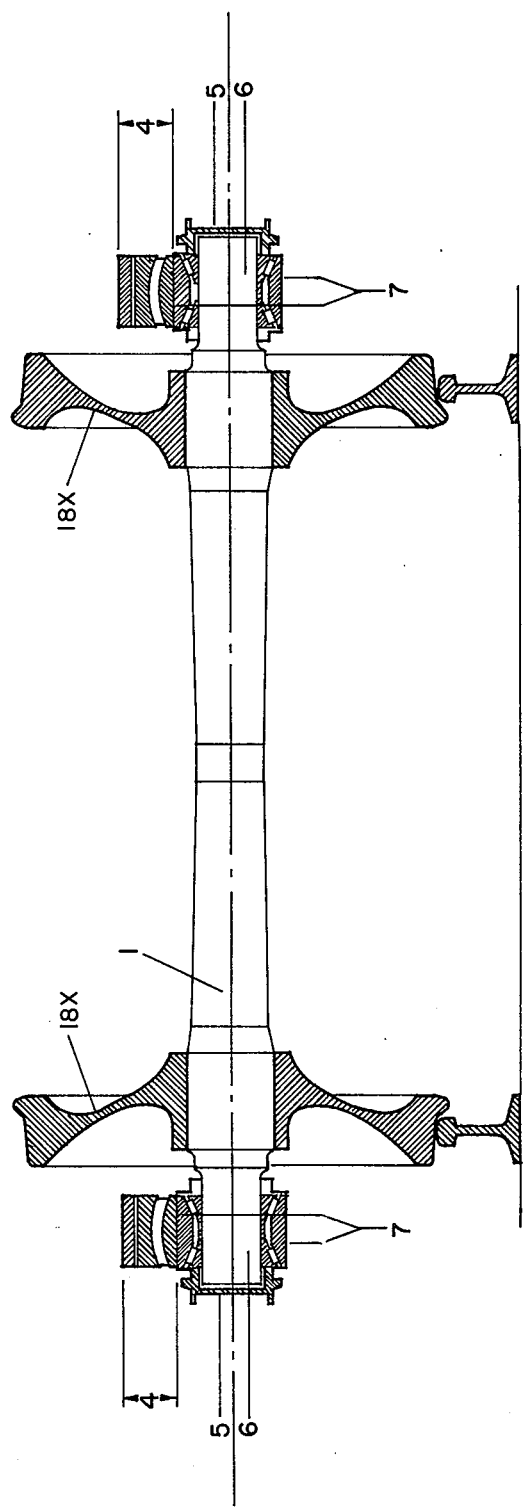
FIG. 1 is a vertical sectional view of an axle-mounted pair of wheels resting on railway type rails, and with the bearing complex, and overhead three-layer cylinder section member resting on the bearing complex at and for each journal end of the axle.

FIG. 6 is an enlarged view of a portion of FIG. 3 showing the V-notch 13 and the gap 11 with the axle box 14 resting on the three layer cylinder section member when the axle is at a right angle to the truck frame, i.e., the truck is centered on straight, or tangent, track.

FIG. 7 is a plan view of FIG. 6 showing the angular relationship of the axle centerline to the journal box.

FIG. 8 is similar to FIG. 6 except that it shows the conditions which will exist when on a track curvature of such degree that the overhead three layer cylinder section member has been rotated with the outer race of the bearing to close the gap 11 of FIG. 6, thus imposing a positive limitation upon the angular movement of the axle.

FIG. 9 is a plan view of FIG. 8 showing the angular relationship of the axle with the journal box.

Referring to FIGS. 2 and 3, it will be seen that the axle journal 1 is mounted in a bearing complex comprising an inner race 2, roller bearings at 3, and an outer race 4. Within the adapter journal box 14 is a three layer cylinder-section assembly composed of an upper member 10 concave at its under face, an intermediate resilient and deformable elastomeric member 9 and having a convex upper face and a lower face, and finally a lower member 8 having a convex upper face and a cylindrical lower face resting on the top of the outer race 4 of the bearing complex.

The sides of the journal box extend downwardly beyond the axis of the axle journal and hold opposed spring abutments for the axle and its bearing complex and directly engaging the latter, the abutments being shown by numeral 6. The said spring abutments are shown as formed of chevron type resilient members, as of suitable elastomer, spaced by like formed metallic plates, the outer face of each abutment carrying a plate engaged by means holding the abutment onto the appropriate journal box side. FIG. 3 shows each side of the adapter journal box holding a screw-like element 7 engaging said plate of the abutment, and any other suitable means may be employed.

In the under top face of the adapter journal box is a sloping V-notch having a function hereinafter described. Also it will be understood that an axle of the truck, by virtue of identical resilient assemblies at each journal location, will move angularly in the horizontal plane effectively pivoting about the intersection the axle and longitudinal truck centerlines when the force developed at contact point 3A of FIG. 4 of the wheel toward the outside of the track curvature imposes such movement in meeting curved rail thus aligning itself radially to the track curvature. Because the journal box 14 is held in the side frame of the truck and rests upon the upper face of the cylinder section 10 at line contact points 15 and 16 of FIG. 3, when on tangent track, holding a portion of the sprung weight of the car plus the unsprung weight of the truck side frame carried by the wheel, such combined weight is imposed upon both.

The effect of the truck entrance into a track curvature is to generate such pressure upon the outside wheels in lateral direction that the axle will rotate angularly, with corresponding movement of the bearing complex and the cylinder section. By the V-notch formation in the inner face of the adapter journal box such action of the cylinder section will lift the journal box. Normally, the cylinder section protrudes into the recess formed by the V-notch shown at 13—13, FIG. 3 with line contact at points 15 and 16. FIGS. 6, 7, 8 and 9 in enlargement and some exaggeration illustrate the action that takes place in the V notch when the truck enters a track curvature. Pressure upon the outside wheels will "rotate" the axle angularly in the horizontal plane with corresponding movement of the bearing complex and the cylinder section, and the cylinder section peripheral area of member 10 in the recess of the V-notch will roll on the sloping surface of the notch with line contact at point 15 or 16, depending upon direction of movement, moving horizontally as the journal box 14 lifts. In other words, the cylinder section with its top member 10 acts as an eccentric in said lifting of the adapter journal box and this action permits the angular movement of the axle with its bearing complex, controlled to a degree by the chevron spring abutments 6.

The rolling thus described is limited by the reduction of gap 11 between journal box 14 and the periphery of the cylindrical Section 10. The locus of the radius of curvature, as indicated in FIG. 3, is moved horizontally by the permissible horizontal movement of line contact points 15 or 16, and at the limit of movement the under radial surface of journal box 14 and the peripheral surface of cylindrical Section 10 will match in solid contact thus preventing further movement.

It will be understood that while the V-notch arrangement is preferred for the lifting of the adapter journal box other means controlled by the cylinder section may be employed within the spirit of the invention.

With respect to the cylinder section, there may be conditions which would not require all three components illustrated and described herein as preferred, as when the journal box 14, without the V-notch, is bonded directly to an elastomeric cylindrical section which in turn rests directly upon the cylindrical outer race of the roller bearing thus dispensing with elements 8, 9 and 10. These and other equivalent modifications which preserve the functions of angular movement of the wheel/axle/bearing set, damping of this movement and positive limitation of the movement are within the spirit of this invention.

Because our new wheel fillet formation coacts with, and materially aids, the action of the cylinder section, we will now describe its form and action.

In FIGS. 4 and 5, the disclosure presents our new and useful form of wheel tread and flange fillet contour, the wheel being shown on a track rail and in a position of equilibrium on tangent track. When entering a track curve — to the right in FIGS. 4 and 5 — the leading outside wheel will be placed at an angle of attack to the outside rail and the leading axle/wheel/bearing set will rotate horizontally counter clockwise. As a result contact point 3A will move both laterally toward the wheel flange in FIG. 5 and in advance of the gravitational perpendicular from the wheel center. The resulting moments of force about the wheel center will cause the wheel to lift with contact point 3A assuming a position of equilibrium such that the effective diameter of the wheel is increased sufficiently that rolling results with no distance deficiency or excess. The wheel set will have moved laterally toward the outside of the curve, contact point 3A will have moved downward on the rail head contour and relatively downward on the flange fillet contour, the wheel set will have rotated clockwise into a position radial to the track curvature and if point 3A is located on the curvature of Section 3, FIG. 5, the wheel tread will be lifted above the rail head.

In the position of equilibrium there exists a resultant force downward along the tangent to the fillet radius at contact point 3A tending to force the wheel downward. However, the adhesion of contact point 3A exceeds this force and there is no change in the location of the point. If the track curvature is sufficiently great, i.e., if the radius of curvature is sufficiently reduced, the location of contact point 3A will be such that the angle of slide — defined as the angle below the horizontal made by a line tangent to the fillet radius at point 3A — will be great enough to produce a resultant force that exceeds the adhesion at point 3A.

Under such conditions the wheel will be forced to slide and move downward slightly thus decreasing the lift of the tread above the top of rail. As a result the effective diameter of the wheel will decrease, a distance deficiency will accrue, the wheel-axle set will rotate counter-clockwise, an angle of attack will be created, and contact point 3A will move to a point in advance of the said gravitational perpendicular. As a result, the moment forces about the wheel center will cause the wheel to lift so that the contact point 3A is moved above the said equilibrium position, thus increasing the effective sheel diameter and compensating the distance deficiency, accompanied by clockwise rotation of the wheel-axle set. After that compensation has been completed, a distance excess will occur, the clockwise rotation will continue and an angle of departure will be created with contact point 3A moving to the rear of the said gravitational perpendicular. Under the combined effect of the slide force component and the angle of departure, contact point 3A will move downward to the equilibrium position with the wheel-axle set moving counterclockwise.

The initiation of the cycle described above will then be repeated in order to dissipate the accumulated distance excess and under the effect of the slide force component. The frequency of the cycle will be low and directly proportional to speed, with quite small angular and vertical movements. For a given track curvature the wear on the rail head will be concentrated on a small portion of the head contour, and since the wheels will traverse varying rail curvatures, wear as to their flanges will be distributed over a greater portion of the flange contour. Of course in any wheel flange form in the equilibrium position, wear will result due to the rotation of the wheels, and out described flange fillet form not only provdes less wear of the wheels traversing curved tracks but materially avoids squeal and undue wear of the wheels and rail, together with providing smooth riding of the truck and car, a sought factor not provided by the constructions now in use.

FIG. 5 illustrates a preferred form of the wheel tread and flange contour meeting the above desired action on all the various railhead contours in use on railroads in the United States, and may be described as follows, with notation of certain modifications to meet special requirements:

The overall width of the wheel 2A, FIG. 4 is for a standard steel freight car wheel. Referring to FIG. 5, the outer flange section 1AA is the standard narrow flange including the standard engaging point 6A. Section 5AA of the contour has the standard coneing of 1 in 20 of the tread but Section 4AA has a non-standard coneing of 1 in 10. Section 3AA of the contour is non-standard and constitutes the principal portion of the flange fillet and Section 2AA is a transition curve to meet the flange contour proper. When the outside wheel is rolling on the curved outside rail, contact point 3A will be located at some position in either Sections 3AA or 4AA of the contour depending upon the radius of track curvature. The shorter the track radius the greater must be the effective diameter of the outside wheel in order that rolling of the wheel will result without distance deficiency or excess with the wheel/axle/bearing set aligned radially to the track curvature.

With respect to the preferred tread and flange contour there may be conditions in which modifications will be desirable such as using a still narrower flange contour proper (Section 1AA FIG. 5). This would permit extension of Section 3AA of FIG. 5, thus making possible an increase in the possible effective diameter of the wheel in order to negotiate very short radius track curves. Such modifications and any others that preserve the function of effective increase in wheel diameter are within the spirit of this invention.

We claim:

1. A self steering construction for axles and wheels of railway trucks, comprising an adapter journal box, a bearing complex adapted to receive the truck axle and including an outer race for bearings, opposed spring elements engaging the sides of the said race and the side inner faces of the journal box, the journal box having an upper wall with a smooth metallic under face, a cylinder section resting on the outer face of the bearing complex, said cylinder section having a smooth metallic upper face receiving the under face of the journal box, and metallic faces of the journal box and the cylinder section being relatively eccentric, whereby upon angular movements of the axle and bearing complex rotational force will be imparted to the cylinder section, effecting rotation and rise of the cylinder section and thereby raising the journal box along with the truck frame resting upon it.

2. A self steering construction for axles and wheels of railway trucks, in accordance with claim 1, in which the cylinder section is composed of three members consisting of a lower member resting in metal to metal contact with the outer race of the bearing, an intermediate elastomeric member and an upper metal member in metal to metal contact with a shallow wave path in the lower face of the journal box, the bottom face of the lower member being shaped semi-annularly in a concave form to fit the outer race of the roller bearing and its upper face shaped semi-spherically in convex form, the lower face of the upper member shaped semi-spherically in a concave form with its upper face formed semi-spherically in convex form entering the peak of the wave path in the under surface of the journal box.

3. A self steering construction for axles and wheels of railway trucks, in accordance with claim 1, in which the cylinder section, being mounted on the top of the outer race of the bearing complex, is positioned to be normally held above and spaced from the opposed spring elements.

4. A construction for axles and bearings of railway trucks, in accordance with claim 1, in which the cylinder section is comprised of three members consisting of a metal lower member resting in metal to metal contact upon the outer race of the axle bearing, an intermediate elastomeric member and an upper member having an outer surface which is annularly convex with its upper surface flat, a shallow V-shaped notch providing an elongated recess formed in the inner top surface of the journal box and having a contiguous flat surface on each side and with which the said upper member of the cylinder section makes line contact, and at the lower end of each contiguous surface the said flat surface is continued downward and conforming to a radius of curvature equal to that of the convex outer surface of the cylinder section, with the locus of said radius so positioned that upon continued roll motion of the cylinder section the said line contact to the junction of the contiguous surface of the V-shaped notch is passed, and its action ceases, with the said radial surfaces meeting, thus preventing further rolling action of the cylinder section.

5. A self steering construction for axles and wheels of railway trucks, according to claim 1 in which the inner face of the adapter journal box is formed with a V-notch providing an elongated recess in which a peripheral area of the cylinder section will normally be received, the journal box V-notch recess having contiguous surfaces on each side completing a wave path by which bodily movement of the cylinder section against said surfaces will lift the adapter journal box.

6. a self steering construction for wheels and axles of railway trucks in accordance with claim 1, in which a resilient and compressible element is positioned between upper and lower elements of the cylinder section and is characterized by its being capable of distortion and to follow angular movement of said lower element induced by like movement of the axle and axle bearing complexes as they align themselves radially to the track curvature.

* * * * *